Oct. 27, 1942.    R. A. SCHAFER ET AL    2,299,851
HYDRAULIC CONTROL APPARATUS FOR MACHINE TOOLS
Filed Aug. 24, 1939    8 Sheets-Sheet 1

Inventors:
Robert A. Schafer
Ralph Rodal
By Williams, Bradbury,
McCaleb & Hinkle,
Attys.

Oct. 27, 1942.   R. A. SCHAFER ET AL   2,299,851
HYDRAULIC CONTROL APPARATUS FOR MACHINE TOOLS
Filed Aug. 24, 1939   8 Sheets—Sheet 2

Inventors.
Robert A. Schafer
Ralph Rodal
By Williams, Bradbury,
McCaleb & Hinkle.
Attys.

Oct. 27, 1942.  R. A. SCHAFER ET AL  2,299,851
HYDRAULIC CONTROL APPARATUS FOR MACHINE TOOLS
Filed Aug. 24, 1939  8 Sheets-Sheet 3

Oct. 27, 1942.　　R. A. SCHAFER ET AL　　2,299,851
HYDRAULIC CONTROL APPARATUS FOR MACHINE TOOLS
Filed Aug. 24, 1939　　8 Sheets-Sheet 4

Inventor.
Robert A. Schafer
Ralph Rodal
BY Williams, Bradbury
McCalel & Hinkle Attys Oct. 27, 1942.    R. A. SCHAFER ET AL    2,299,851
HYDRAULIC CONTROL APPARATUS FOR MACHINE TOOLS
Filed Aug. 24, 1939    8 Sheets-Sheet 8

Fig. 16.

Inventors
Robert A. Schafer
Ralph Rodal
By Williams, Bradbury & Hinkle Attys.

Patented Oct. 27, 1942

2,299,851

UNITED STATES PATENT OFFICE 2,299,851

HYDRAULIC CONTROL APPARATUS FOR MACHINE TOOLS

Robert A. Schafer and Ralph Rodal, Richmond, Ind., assignors to National Automatic Tool Company, Richmond, Ind., a corporation of Indiana Application August 24, 1939, Serial No. 291,656

11 Claims. (Cl. 121—45)

Our invention relates generally to machine tools, and more particularly to improvements in hydraulic control apparatus for such tools.

The underlying principles of the hydraulic control apparatus of our invention are applicable to a large variety of machine tools, for controlling the actuation of the tools toward and from the work, or conversely, controlling the movement of the work toward and away from the tools, or may be applied to control the movement of any other part of such machine tool. In this application, our invention is, however, described as applied to the control of a horizontal unitary machine tool for performing drilling, tapping, reaming, facing and similar operations.

In accordance with our invention, the rate of feed of the tools toward the work is determined by improved metering devices which control the rate at which the oil may flow from the end of the cylinder (opposite the end to which the oil under pressure is supplied) to the drain or sump. By virtue of this arrangement, the possibility of the tool pulling into the work due to the torque pull at the cut is substantially eliminated since such pulling force is resisted by the restricted flow of oil from the non-pressure end of the cylinder to the sump.

It is thus an object of our invention to provide an improved hydraulic feeding apparatus for machine tools, whereby the disadvantageous effect of having the machine tool pull into the work is substantially eliminated.

A further object of our invention is to provide an improved hydraulic control apparatus for machine tools which is very compact and in which the necessity for a large number of pipe fittings and bends in the oil flow conduits is eliminated.

A further object is to provide a hydraulic control apparatus for machine tools in which a part of the machine tool is hydraulically actuated under the control of a directional valve which in turn may be controlled either by a hand operated pilot valve or by an automatically operated pilot valve, the pilot valves being of small dimensions and being capable of actuation by the application of small forces, thus eliminating the necessity of providing large powerful solenoids for the actuation of the control valve, and also eliminating the necessity for the use of springs. As is well understood in the art, springs in continuous use in apparatus of this character are undesirable because of the possibility of their eventual failure due to the fatigue characteristic. By providing easily operable pilot valves, small solenoids which readily fit into the design of the apparatus, and which are comparatively inexpensive, may be utilized, and the hazard of using springs avoided.

A further object is to provide a hydraulic control apparatus for machine tools having a manually operable pilot valve for controlling the actuation of a part of the machine tool and having an automatically operated pilot valve, in which means are provided to lock the hand operated pilot control valve when the automatic pilot valve is effective and which, when the hand pilot valve is effective, positions the automatic pilot valve properly with respect to the position of the machine tool part in its cycle, so that the hand pilot valve may be rendered ineffective at any time during the cycle, whereupon the automatic pilot valve will be in proper position to control the actuation of the machine tool part through its proper cycle of operation.

A further object is to provide an improved hydraulic control apparatus for machine tools in which both automatic and manual control are possible, the manual control being particularly useful when the machine is being set up or tools are being changed, and in which means are provided for rendering the manual control inoperable whenever the automatic control is rendered effectively operable.

A further object is to provide an improved hydraulic control apparatus for machine tools in which both manual and automatic controls are provided, and in which means are provided to prevent rendering the automatic control operative unless the hand control is in neutral or stop position, so that the machine may be stopped at any time in its automatic cycle by shifting from automatic to hand control, and upon reverting to automatic control the machine may resume operation at the point in the cycle at which the hand operation was interrupted, since, during the time that the machine is being operated under hand control, the automatic control is actuated (although ineffectively) so as to be in the condition at any time to resume control at the proper point in the cycle of operation.

A further object is to provide an improved hydraulic control apparatus for machine tools in which a directional valve is employed, and in which the sequence of operations of said valve differs from the desired sequence of operations of the part controlled by the valve. It will be understood that in prior constructions it was common practice to have the directional control valve (which actually controlled the admission of oil to the actuating piston and cylinder of the part of the machine tool to be moved) move sequentially to positions which would cause the head of the machine tool to operate through the following cycle: From neutral position through rapid forward traverse, coarse feed, fine feed, stop, and reverse traverse. In this type of control it was necessary, to initiate a new cycle, to move the directional control valve past the reverse position. This passing over of the reverse position caused a momentary reverse movement of the tool carrying head, which sometimes resulted in an abrupt jar of the head with consequent noise and wear upon the parts.

In the construction of the present invention, the directional valve moves from neutral or stop position through fine feed and coarse feed to rapid traverse forward, then successively to coarse feed forward, fine feed forward, passing over stop or neutral, rapid traverse reverse, and finally, returning to neutral or stop position.

To reach the rapid traverse reverse position, the directional valve must pass over the neutral or stop position, and then be brought back to the neutral position to stop the reverse traverse. Thus in initiating a new cycle, it is not necessary for the directional control valve to move through the reverse traverse position in order to reach the forward traverse position.

A further object is to provide an improved form of hydraulic pilot valve controlled apparatus.

A further object is to provide an improved hydraulic control apparatus for machine tools which is very compact in construction, composed of few moving parts, which is easily adjusted and regulated, and which may be inexpensively manufactured.

A further object is to provide an improved hydraulic control apparatus formed in a unitary assembly in which substantially all of the working parts are readily accessible from the outside of the unit without completely dismantling it, for inspection and service.

Other objects will appear from the following description, reference being had to the accompanying drawings, in which.

General description

It is believed that the necessary detailed description of our invention will be more readily understood if it is preceded by this brief general description of the machine tool and the hydraulic control apparatus therefor.

Figure 1:
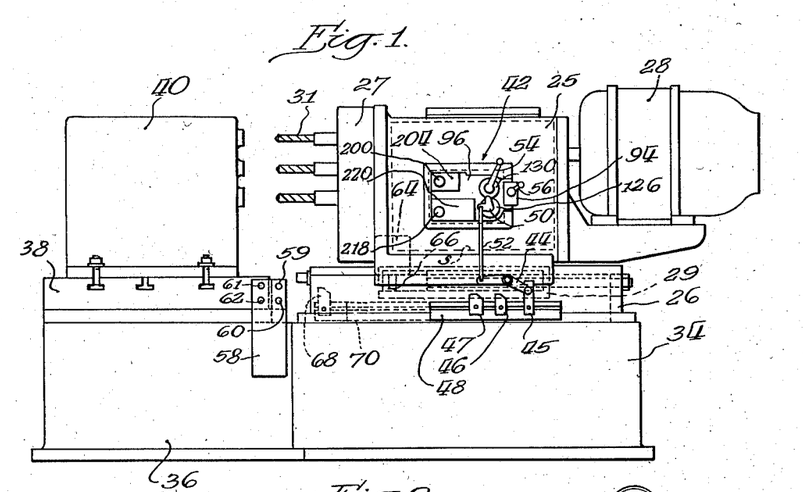
Figure 1 is a side elevational view of an exemplary machine tool embodying the hydraulic control of our invention.
Figure 2:
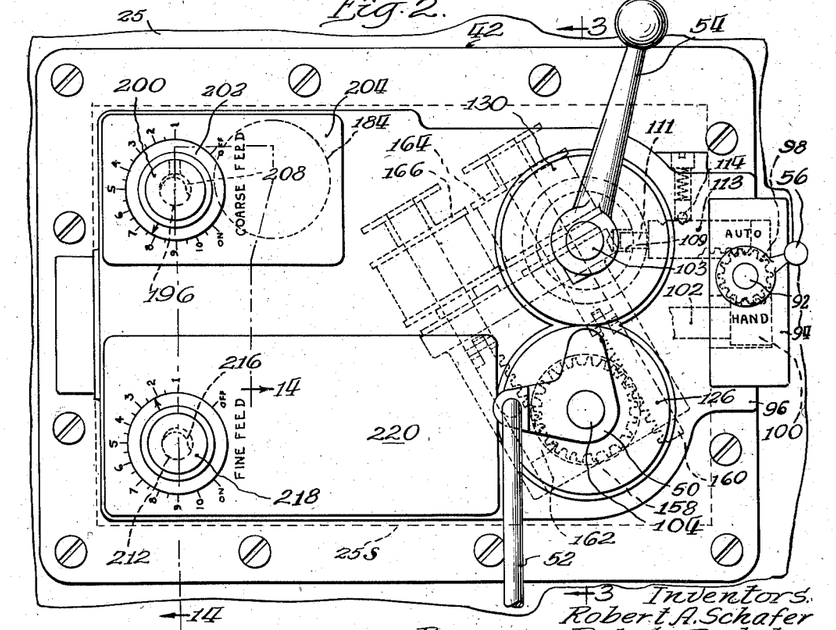
Figure 2 is an elevational view of the hydraulic control panel.
Figure 15:
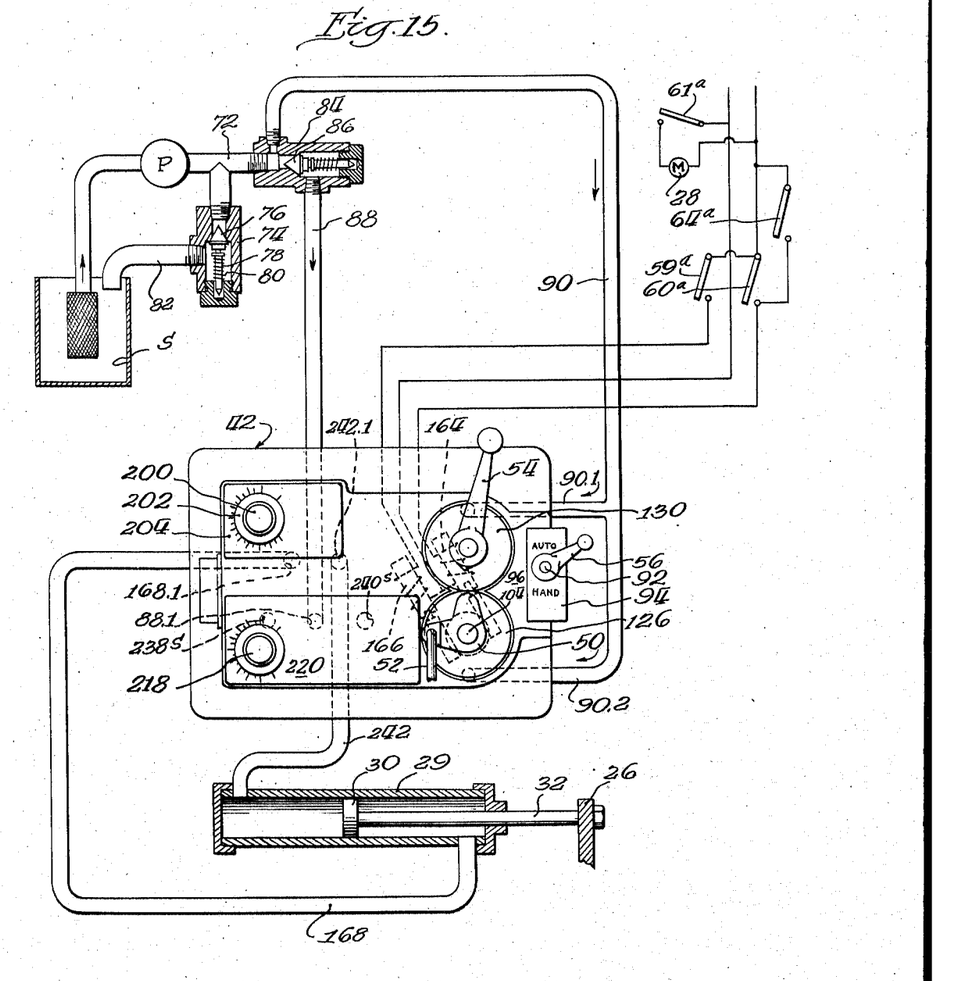
Figure 15 is a diagrammatic view showing the complete system and the circuits for the operation of the solenoids.

Referring particularly to Figures 1, 2 and 15, our invention is illustrated as applied to an automatic drilling machine comprising a self-contained unit consisting of a housing 25 which is mounted to slide on a stationary sub-base 26. The housing includes a head 27, a hydraulic reservoir or sump S (Fig. 15), a pump P driven by a motor 28, which also drives the tools 31. A hydraulic feed cylinder 29 is rigidly secured to the housing 25 and has a piston 30 carried by a piston rod 32 which is rigidly secured to a portion of the sub-base 26. The sub-base 26 is suitably secured to the machine base 34 which may be formed integrally with or may be secured to a work supporting base 36 having a table 38 formed integrally with or secured thereto, a piece of work 40 upon which the drills 31 are to operate is illustrated as being bolted to the table 38. The control unit 42 is mounted upon the side of the housing 25, the latter being hollow and forming a reservoir for oil, and comprises a lever 44 which is suitably pivoted on a downwardly projecting portion of the housing 25 and the right-hand arm of which is adapted to contact seriatim with dogs 45, 46 and 47, which are adjustably secured upon a support 48 which is rigidly secured to the sub-base 26. The dogs 45, 46 and 47 are of unequal elevations so that as the housing 25 moves with respect to the sub-base 26, the lever 44 will be pivoted through an angle determined by the height of the tops of the dogs 45, 46 and 47.

The left-hand arm of the lever 44 is operatively connected with an arm 50 by a rod 52, the arm 50 being connected to the automatic pilot valve, as will hereinafter be described in detail.

A manually operable handle 54 is connected to the hand pilot valve, and a handle 56 is connected to a throw-over valve and locking mechanism, by which the automatic pilot valve and the hand pilot valve may be alternatively rendered ineffective, and by the operation of which the hand pilot valve may be locked in position when the automatic pilot valve is rendered effective to control the operation of the machine.

A panel 58 is secured to the work piece base 36 and carries four push buttons 59, 60, 61, and 62, which operate electric switches. Push button 59 operates to close a switch 59a which resets the hydraulic control unit to initiate a cycle of the tool head while the push button 60 closes a switch 60a (Fig. 15) to close and thereby to initiate a rapid reverse traverse operation of the machine tool head. Push button 61 starts the electric motor 28, while push button 62 stops this motor by the use of a suitable switch mechanism.

Upon the opposite side of the housing 25 is a limit switch 64 which is secured to the housing and has a switch actuator 66 which is engageable with a dog 68 adjustably positioned upon a rail 70 secured to the sub-base 26. The limit switch 64 includes a contact arm 64a (Fig. 15), which it will be noted, is connected in parallel with the switch 60a.

Referring now to the diagrammatic view of Fig. 15, it will be noted that the pump P draws the power fluid, which will hereinafter be referred to as oil, from the sump S and delivers it under pressure to a T 72, one branch of which is connected to a pressure relief valve body 74 which may be constructed in any suitable manner, but is illustrated as including a conical valve 76 having a loose valve stem 78 and a compression coil spring 80 surrounding the stem and holding the valve 76 against its seat. The degree of compression of the spring 80 is such that the valve opens only when the pressure in the T 72 exceeds a predetermined maximum value, in the order of 650 pounds per square inch, the oil by-passed through the valve body 74 being returned to the sump S through a conduit 82.

The other arm of the T 72 is connected to a pressure maintaining valve body 84 having a spring pressed valve 86 similar to that included in the valve body 74 except that it may open at a much lower pressure, namely a pressure in the order of 50 pounds per square inch. A conduit 90 is connected to the valve body 84 so as to be supplied with oil at the pressure at which it is maintained in the T. Generally speaking, the oil supplied through the conduit 88 is provided for the actuation of the cylinder and piston 29, 30 while the oil supplied through the conduit 90 is utilized for the actuation of the valve mechanism. Under certain conditions (when the directional valve is in neutral position, Fig. 9) as will appear hereinafter, the pressure in the conduit 88 drops to atmospheric pressure, and the pressure retaining valve 86 is thus necessary to maintain sufficient pressure in the conduit 90 for the actuation of the directional valve and its pilot valves.

In the following detailed description of the invention, in order to facilitate following the hydraulic circuits, all passageways, conduits, ports, and the like, which are in communication with each other at all times, so that irrespective of the phase of the operating cycle, oil could flow from one to another, will be given the same reference character followed by decimals to distinguish individual parts. Thus, for example, when it is stated that oil under pressure flows into a conduit bearing a certain reference character, it will be understood that oil in all parts bearing that reference character followed by a decimal fraction will likewise be under pressure.

Similarly, all passageways, etc., through which oil is at all times free to discharge to the sump will be followed by the letter S which should be interpreted to mean "From which the oil may flow freely to the sump."

*Hand to automatic throw-over valve*

Figure 7:
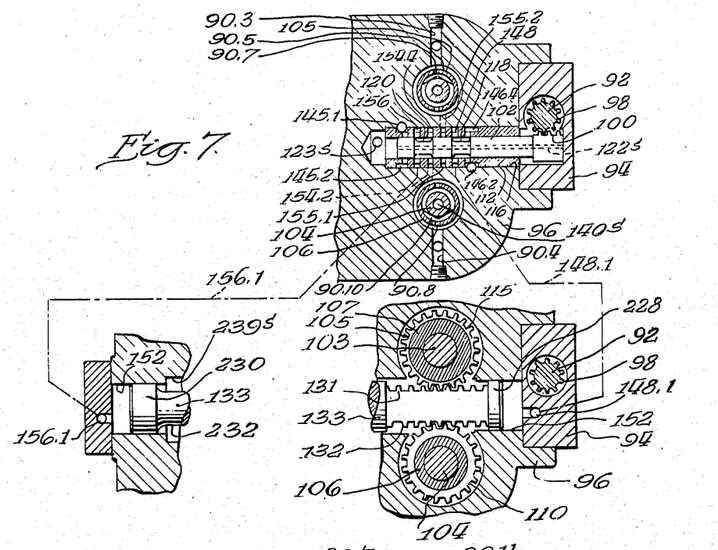
Figure 7 is a fragmentary sectional view of the throw-over valve, together with fragmentary portions of the directional valve, the throw-over valve being shown in position for control by the automatic pilot valve.
Figure 8:
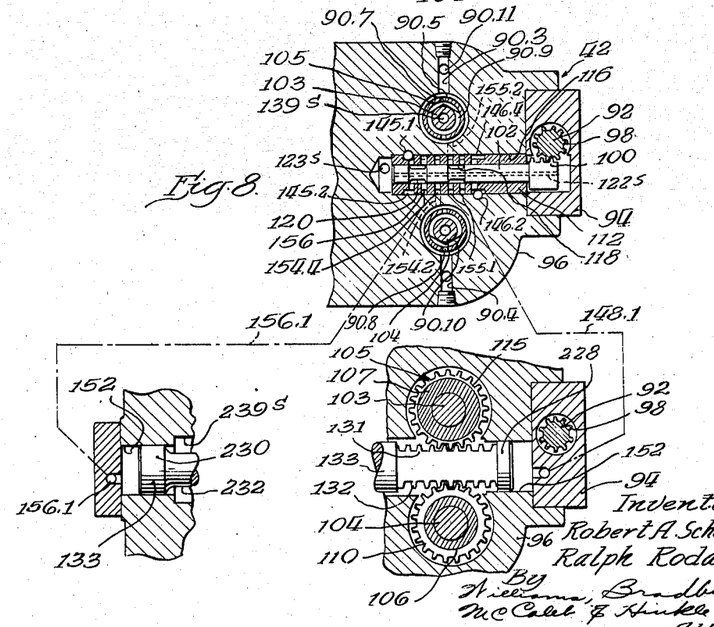
Figure 8 is a view similar to Figure 7, with the throw-over valve in position for control by the hand pilot valve.

As previously stated, the apparatus of our invention may be manually controlled, or may be automatically controlled. There is thus a hand operable pilot valve and an automatically operated pilot valve, the pilot valves being generally similar and each being capable of controlling the position of the directional valve. The means for determining which of these two pilot valves shall control the operation of the directional valve consists of a throw-over valve which is operated by the handle 56, the handle being intended as illustrative of any suitable means for shifting this valve between its two effective positions. The handle 56 is suitably secured to a stub shaft 92 which is journaled in an end block 94 suitably secured to the main panel 96. As shown in Figs. 7 and 8, the lower end of the stub shaft 92 has pinion teeth 98 formed thereon for engagement with a rack 100 formed on the throw-over valve 102. The throw-over valve 102, when in the position in which it is shown in Fig. 7, renders the hand pilot valve inoperative, and when in the position shown in Fig. 8 renders the automatic pilot valve inoperative.

Figure 3:
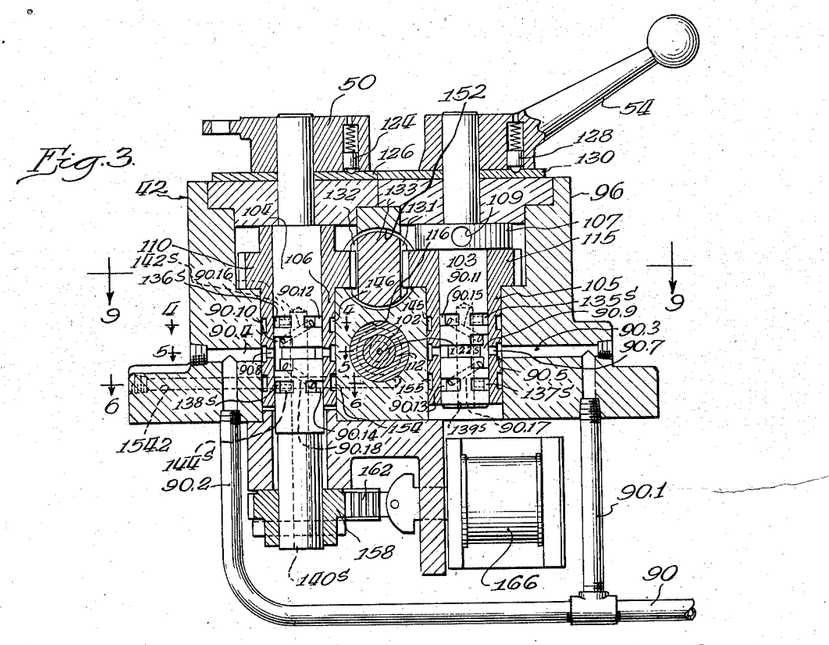
Figure 3 is a transverse sectional view taken on the line 3—3 of Figure 2.

As shown in Fig. 3, the handle 54 is connected to a hand pilot valve 103, the hand pilot valve being surrounded by a follower sleeve valve 105 and having a portion 107 of increased diameter provided with a hole 109 to receive a locking pin 111 formed at the end of a rack 113 which is engageable with the pinion teeth 98 formed on the stub shaft 92. A spring pressed detent 114 (Fig. 2), engageable with notches formed in the rack 113, is adapted to hold the rack in either of its extreme positions with the locking pin 111 in engagement with the hole 109 or free from engagement therewith. By virtue of this construction, when the throw-over lever 56 is shifted to its upper (Fig. 2) or automatic position, the hand pilot valve lever 54 is locked in position.

The throw-over valve 102 cooperates with a ported sleeve 112 which is pressed into a bore 116 in the panel 96 and has a plurality of ports, hereinafter to be described in detail, some of which may be interconnected by annular passageways 118 and 120 formed in the throw-over valve 102. The throw-over valve has an axially drilled hole 122S extending from end to end thereof to permit flow of oil whenever this valve is shifted, the end of the bore 116 being in communication with the sump through a passageway 123S.

*Hand and automatic pilot valves*

The conduit 90 (Fig. 15) is divided into two branches 90.1 and 90.2 which supply oil under pressure to the hand and automatic pilot valve through ducts 90.3 and 90.4, respectively. The automatic pilot valve 104 is secured to the arm 50, a spring pressed detent 124 being engageable in notches formed in a plate 126 so as to hold the arm 50 in the position to which it is moved by the dogs 45, 46, 47.

The handle 54 has a similar detent 128 engageable with recesses formed in plate 130.

The automatic pilot valve 104 has a follower sleeve valve 106, having a pinion 110 formed integrally therewith, the corresponding hand follower sleeve valve 105 having a similar pinion 115 formed integrally therewith, the pinions 110 and 115 meshing with a pair of racks 132 and 131 formed on a directional valve 133, which will be described in further detail hereinafter, the present consideration being that the follower sleeve valves 105 and 106 always move through corresponding angular distances by virtue of the fact that each is geared to the directional valve 133.

The sleeve valve 105 has an annular port 90.5 which through ports 90.7 communicates with a chamber 90.9 formed by milling away portions of the pilot valve 103. Chambers 90.11 and 90.13 communicate with the chamber 90.9 through pairs of ducts 90.15 and 90.17, respectively, while chambers 135S and 137S are formed in the pilot valve 103 and communicate with a drain duct 139S.

Figure 4:
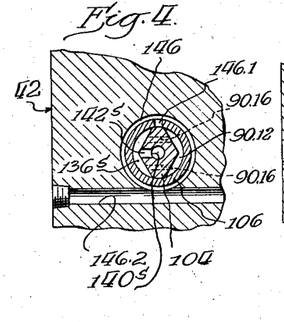
Figures 4, 5 and 6 are fragmentary sectional views taken on the line 4—4, 5—5 and 6—6, respectively, of Figure 3.
Figure 5:
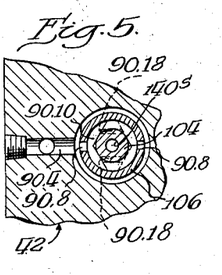

In a similar manner, the automatic pilot valve 104 has a chamber 90.10 which communicates with the drilled passageway 90.4 through ports 90.8, the chamber 90.10 communicating with chambers 90.12 and 90.14 through pairs of ducts 90.16 and 90.18, respectively. Chambers 136S and 138S formed in the valve 104 communicate with an axially drilled passageway 140S through ports 142S and 144S, respectively, as shown in Figs. 4 and 6.

The chamber 90.10 is of the irregular shape illustrated, so that the hydraulic pressure exerted upon the walls of this chamber will be exactly balanced by the hydraulic pressure exerted upon the walls of chambers 90.12 and 90.14. The pilot valve sleeve 106 has an external annular groove 146 which communicates with a cross drilled passageway 146.2 which leads to an annular groove 146.4 (Figs. 7 and 8) formed in the ported sleeve 112 of the throw-over valve 102. From the groove 146.4 the oil may flow through the annular passageway 118 (when the throw-over valve is in the automatic position, as shown in Fig. 7) to an annular groove 148 which, through a duct represented by the dot-dash line 148.1 communicates with the right-hand end (Fig. 7) of directional valve cylinder 152. It will be noted from Fig. 8 that oil cannot escape from the passageway 146.2 when the throw-over valve 102 is shifted to the hand control position.

Figure 6:
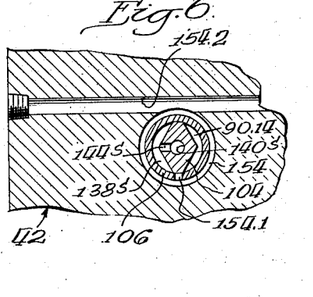

The follower sleeve 106 of the automatic pilot valve has an annular groove 154 which, as shown in Fig. 6, is in communication with a cross drilled duct 154.2, the duct 154.2 leading to an annular passageway 154.4 formed in the throw-over valve sleeve 112, the annulus 154.4 being connected with a similar annular groove 156 and a suitable passageway represented by the dot-dash line 156.1 with the left-hand end of directional valve cylinder 152.

In a similar way, the chambers 135S and 137S communicate with the axially drilled hole 139S of the hand pilot valve 103, and the hand pilot sleeve valve 105 has an annular passageway 145 which communicates with a passageway 145.1 leading to an annular passageway 145.2 formed in the sleeve 112 of the throw-over valve 102. An annulus 155 formed in the manual pilot valve sleeve 105 communicates with an annulus 155.1 in the throw-over valve sleeve 112 through a cross drilled hole 155.2. Thus, when the throw-over valve is shifted to the hand position, as shown in Fig. 8, the annulus 155.1 communicates through the annular passageway on the throw-over valve 102 with the annulus 148, the latter being in communication with the right hand end of directional valve cylinder 152 through the duct 148.1.

Similarly, when the throw-over valve is in hand control position, as shown in Fig. 8, the annulus 145 communicates, through cross drilled hole 145.1, annulus 145.2, annular passageway 120 of the throw-over valve, with annulus 156, and hence through conduit 156.1 with the left-hand end of the directional valve cylinder 152.

It will be noted from Fig. 4 that the section of the automatic pilot valve 104 between chambers 90.12 and 136S is a generally diamond shape, to form a slide valve with respect to port 146.1 formed in the valve sleeve 106. Similarly, the section of the pilot valve 104 between the chambers 90.14 and 138S is such as to form a cut-off valve for a port 154.1 formed in the sleeve 106. The sleeve 105 of the manual pilot valve 103 has ports corresponding with the ports 146.1 and 154.1.

The automatic pilot valve 104 has a pinion 158 secured thereto (Fig. 3), the pinion having a pair of racks 160 and 162 (Fig. 2) in mesh therewith, these racks being operatively connected with the armatures or plungers of solenoids 164 and 166, respectively.

Figure 11:
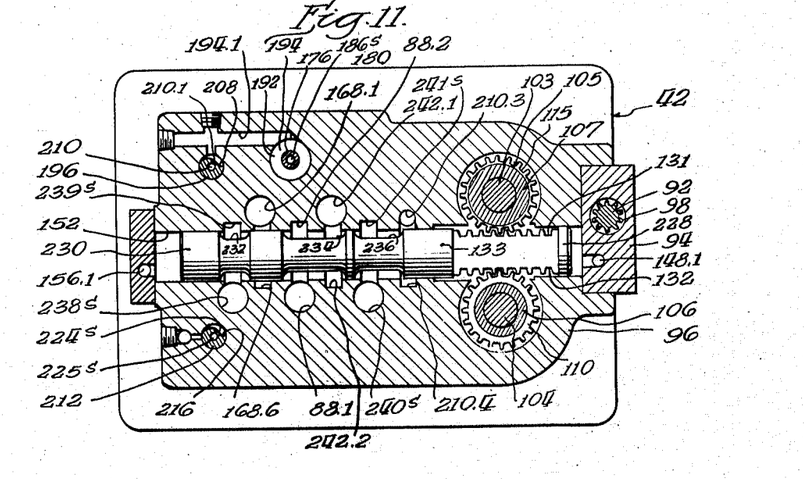
Figure 11 is similar to Figure 9, with the directional valve in position for coarse feed.

Disregarding for a moment the functions of the directional control valve 133, the hydraulic circuits by which this control valve may be shifted will now be described. It will be understood that the directional valve 133 (see e. g. Fig. 11) forms a freely sliding piston in its cylinder 152. The sole purpose of the pilot valves is to move the directional valve 133 rapidly to any one of its five positions, which are: (a) Stop, or neutral; (b) fine feed; (c) coarse feed; (d) rapid forward traverse; and (e) rapid reverse traverse.

These five positions of the directional valve are shown in Figs. 9, 12, 11, 10 and 13, respectively.

Assuming that the directional valve is in its stop or neutral position, and that the automatic pilot valve 104 is moved clockwise (Figs. 2 and 15) by the energization of solenoid 166 as a result of closing switch 59a by means of the push button 59, the resulting operations of the pilot valve will take place substantially continuously, but will be described herein as if they took place in a series of separate steps. As soon as the pilot valve 104 starts to move clockwise, the ports 146.1 and 154.1 in the pilot valve sleeve 106 will be uncovered. As a result, oil under pressure in the chamber 90.14 will flow through the port 154.1, annulus 154, cross drilled duct 154.2, to the annulus 154.4 of the throw-over valve sleeve (and assuming that the throw-over valve 102 is in the automatic position of Fig. 7) through the annular passageway 120 of the throw-over valve and hence to the annulus 156 of the throw-over valve sleeve and passageway 156.1 to the left-hand end of the directional valve vylinder 152. At the same time, the oil from the right-hand end of the directional valve cylinder 152 flows through the conduit 148.1, through the annulus 148, annular passageway 118 of the throw-over valve, annulus 146.4 of the throw-over valve sleeve, cross drilled duct 146.2, annulus 146 of the pilot valve sleeve 106, port 146.1, and hence to chamber 136S. Oil under pressure is thus supplied to the left-hand end of the directional valve 133 and permitted to flow to the sump from the right-hand end thereof. The directional valve 133 thus moves to the right (Fig. 7) and by this movement through its rack 132 rotates pinion 110 clockwise.

Clockwise movement of the pinion 110 and consequent clockwise movement of the pilot sleeve 106 results in closure of the ports 146.1 and 154.1, thereby cutting off the supply of pressure to the left-hand end of the directional valve cylinder 152, and likewise cutting off the connection to the sump from the right-hand end of the directional valve cylinder. Thus, any clockwise movement of the pilot valve 104 will immediately result in movement of the directional valve and consequent movement of the pilot valve sleeve 106 in a clockwise direction until the pilot valve 104 and sleeve 106 are in the same relative positions as these parts are shown in Figures 3 to 6, inclusive.

In a similar manner, rotation of the pilot valve 104 in a counter-clockwise direction results in a corresponding angular movement of the pilot valve sleeve 106 and leftward displacement of the directional valve 133.

The hydraulic circuits which cause the latter operation upon counter-clockwise movement of the pilot valve 104 will now be described. Oil under pressure supplied through the port 90.8 flows through chamber 90.10 and passageways 90.16 to chamber 90.12, through the now uncovered port 146.1, annulus 146, cross drilled duct 146.2 to annulus 146.4 of the throw-over valve, annular passageway 118 of the throw-over valve 102, annulus 148, duct 148.1 to the right-hand end of directional valve cylinder 152, thus applying pressure to the directional valve causing its movement toward the left. The oil from the left-hand end of the cylinder 152 flows outwardly through the duct 156.1, annulus 156 of the throw-over valve sleeve, annular passageway 120 formed in the throw-over valve 102, annulus 154.4, duct 154.2, annulus 154, into the then uncovered port 154.1 and chamber 138S. As the result of the leftward movement of the directional valve 133, the pilot valve sleeve 106 will be rotated counter-clockwise, and thus follow the movement of the pilot valve 104 until the ports 146.1 and 154.1 are again closed by the pilot valve 104.

From the foregoing, it will be seen that when the pilot valve 104 is moved any angular distance in either direction, such movement is immediately followed by equal angular movement of the pilot valve sleeve 106 and proportional movement of the directional valve 133. In this way, by the application of a relatively small torque to the pilot valve 104, relatively large forces may be hydraulically applied to the directional valve 133 for the shifting of the latter, and the control is such that the directional valve 133 follows substantially instantaneously, and in very accurate proportionality, the movement of the pilot valve.

The hydraulic circuits which are completed when the throw-over valve is in the hand control position, as illustrated in Fig. 8, will now be described. It will be noted from Fig. 8 that the throw-over valve 102 cuts off communication from the ducts 146.2 and 154.2 which lead to the automatic pilot valve. In addition, it puts the duct 145.1 in communication with the duct 156.1 and puts the duct 155.2 in communication with the duct 148.1. It will be noted that the ducts 145.1 and 155.2 correspond respectively with the ducts 146.2 and 154.2 of the automatic pilot valve. Thus, when the throw-over valve is in the hand position shown in Fig. 8, the hand pilot 103 and its sleeve 105 will operate in the same manner as above described with reference to the pilot valve 104 and its sleeve 106, to control the shifting of the directional valve 133. Since the operation of these parts under hand control corresponds exactly with their operation under the control of the automatic pilot valve, it is believed that it is unnecessary to repeat the details of the hydraulic circuits by which the shifting of the directional valve is accomplished under the control of the hand pilot valve 103 and its sleeve 105.

Coarse and fine feed controls

As previously stated, the rate at which the machine tool part is moved is determined by controlling the rate of flow of oil from the rod end of the actuating cylinder 29. The flow from this cylinder may be free for rapid forward traverse, may be restricted by a coarse feed valve for the coarse feed, or may be greatly restricted by the adjustable fine feed valve.

Figure 14:
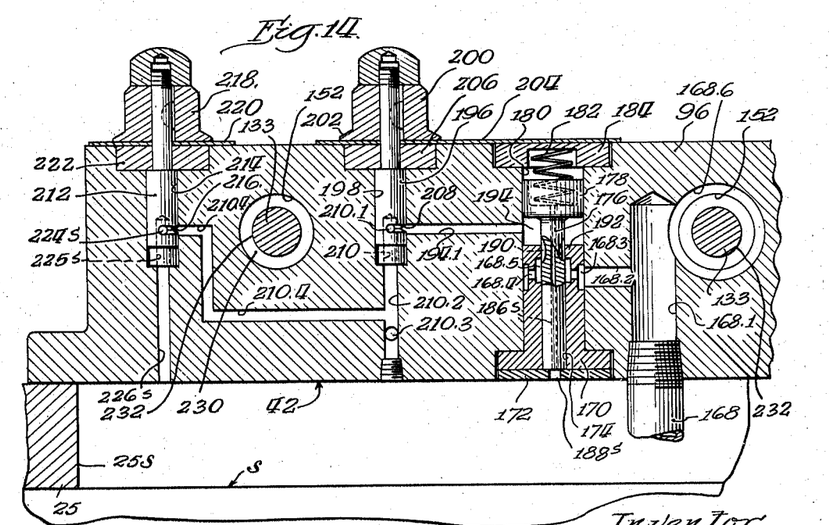
Figure 14 is a developed sectional view taken substantially on the line 14—14 of Figures 2 and 13, showing particularly the governor and the coarse and fine feed adjusting valves.

Thus, the rate at which the head is moved during the forward feeding portions of the cycle is determined by the rate at which oil may escape through a conduit 168 which is connected to the rod end of cylinder 29 (Fig. 15) and leads to a drilled passageway 168.1 formed in the control panel 96 (Fig. 14). The drilled passageway 168.1 intersects the directional valve cylinder 152 and has a sidewardly directed branch 168.2 which communicates with an annulus 168.3 formed in a feed governor valve sleeve 170 which is held in place in the panel 96 by an apertured plate 172. The valve sleeve 170 has a cylindrical bore 174 formed therein to receive the stem 176 of the governor valve, the stem 176 being formed integrally with a piston portion 178 which is guided in the bore 180 in which the sleeve 170 is fitted. The piston 178 and its stem 176 are pressed downwardly by a compression coil spring 182, the upper end of which is received in a socket formed in a removable plug 184 secured in the panel 96. The stem 176 has an axially drilled hole 186S by which the space in the bore 180 above the piston is at all times in free communication with the sump through the aperture 188S formed in the securing plate 172.

Stem 176 has a pair of arcuate slots 190 formed therein to form passageways for oil around an annular valve seat 192 formed on the sleve 170, and thus permit flow of oil from the annulus 168.3, ports 168.4 and chamber 168.5 through the slots 190 into a chamber 194 which is the part of the bore 180 between the piston 178 and the upper end of the slevee 170. It will be understood that the valve stem 176 is normally in the position in which it is shown in Fig. 14, but that should the pressure within the chamber 194 become built up to a value sufficient to cause a piston 178 to compress the spring 182, the piston 178 and the stem 176 will move upwardly, thus partially closing the ports formed by the arcuate slots 190. These parts thus act as a governor to prevent the pressure within the chamber 194 from exceeding a predetermined value, such, for example, as 20 pounds per square inch.

The rate at which oil may escape from the chamber 194 determines the speed at which the cylinder 29 will move during the coarse feed and fine feed portions of the operating cycle. For the purpose of controlling the rate at which the oil may escape from this chamber 194 for the coarse feed portion of the cycle, an adjustable coarse feed valve 196 is provided. This valve is rotatable in a bore 198 and is non-rotatably secured to a control knob 200 which has a pointer on its base flange 202 for cooperation with graduations and indicia etched or otherwise marked upon a plate 204. The valve 196 is held within its bore by a bushing 206 and has an arcuate V-shaped groove 208 of gradually tapering depth formed along a portion of its periphery for registration with a passageway 194.1 leading to the chamber 194.

The deeper end of the V-shaped groove 208 communicates with an axially drilled hole 210 formed in the valve 196 through a radially drilled port 210.1. It will be understood that as the valve 196 is rotated, the cross sectional area of that portion of the groove 208 which is adjacent the passageway 194.1 may be varied, and since it is mainly that portion of the groove 208 of least cross sectional area which determines the rate at which oil will flow from the passageway 194.1 to the drilled hole 210, the angular position of the valve 196 effectively determines the rate at which the oil may escape from the rod end of the cylinder 29—provided the oil may flow freely from the drilled hole 210 of the valve 196.

In the coarse feed position of the directional valve 133, the oil flowing from the drilled hole 210 may flow with a minimum of resistance to the sump through a passageway 210.2 which communicates with a duct 210.3 and from the latter duct through the directional valve to the sump, as will appear hereinafter.

When the directional valve is in position for completing the fine feed portion of the machine cycle, the duct 210.3 is blocked, as will be described hereinafter, and the oil in the passageway 210.2 thus flows through the connecting passageway 210.4 to the fine feed adjusting valve 212 which is rotatable in a valve cylinder 214 formed in the panel 96.

The valve 212 is of substantially the same construction as the valve 196, although its V-shaped restriction groove 216 may be cut less deep than the corresponding groove 208 of the valve 196.

Figure 13:
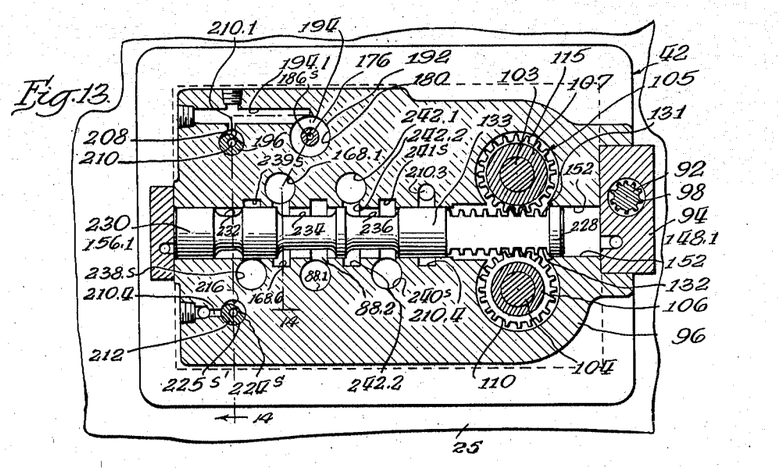
Figure 13 is a view similar to Figure 9, showing the directional valve in position for rapid reverse traverse.

The valve 212 has a control knob 218 secured thereto, this valve having a pointer cooperable with graduations and indicia formed upon a plate 220 which is suitably secured to the panel 96, the valve being held in position by a bushing 222 threaded or otherwise suitably secured in the panel 96. The valve 212 has a port 224S communicating with an axially drilled passageway 225S which is in open communication with a passageway 226S leading to the sump. It will be understood that the sump is located directly inside of the panel 96 so that any passageways, such as the passageway 226S, which extend to the inner surface of the panel 96, discharge into the sump. This is best shown in Figs. 2, 13, and 14, wherein the panel 96 is shown as secured over an opening 25S formed in the casing 25.

From the foregoing, it will be seen that when the passageway 210.3 is blocked by the directional valve, the oil from the rod end of the cylinder 29, after flowing through the governor valve 176, must flow successively through the flow restricting valves 196 and 212, which constitute, respectively, the adjustable valves for coarse feed and fine feed.

The directional control valve

The directional control valve 133, as previously described, is reciprocable in a cylinder 152, the head ends 228 and 230 forming in effect pistons for reciprocation of the valve. The valve has annular passageways 232, 234 and 236 which are adapted to interconnect certain of the annular grooves formed in the cylinder 152.

Oil under pressure from the conduit 88 is supplied through a passageway 88.1 to an annulus 88.2. The previously described drilled passageway 16.1 communicates with an annular groove 168.6 formed in the wall of the cylinder 152. Passageways 238S and 240S, communicating respectively with annular grooves 239S and 241S, discharge directly into the sump.

A conduit 242 connected to the forward end of the cylinder 29 leads to a drilled passageway 242.1 which communicates with an annular groove 242.2 formed in the walls of the cylinder 152. The passageway 210.3 previously described in connection with the operation of the fine feed control valve communicates with an annular groove 210.4 formed in the wall of the cylinder 152.

Operation of directional valve

As previously described, the position of the directional valve is quickly and accurately determined by the position of either the automatic pilot valve 104 or the position of the hand pilot valve 103, depending upon the position of the throw-over valve 102. The functions of the directional valve 133 will first be described with reference to Fig. 9, in which this valve is in its "stop" or "neutral" position. Under these circumstances, it will be noted that the oil under pressure supplied to the annular groove 88.2 flows freely, via the annular passageways 234 and 236 to the passageway 240S to the sump. While both ends of the cylinder 29 are also in communication with the oil pressure supply, (via 88, 88.1, 88.2, 234, 242.2, 242.1, and 242, and via 88, 88.1, 88.2, 234, 168.6, 168.1, and 168) the pressure in the cylinder will be negligibly low. Thus even though the piston is of the usual differential type no motion of the cylinder and machine tool head will take place.

The advantage of having the oil under pressure connected substantially without restriction (the only restriction being that offered by valve 86) to the sump whenever the head is in neutral or stop position, is that the oil is not unnecessarily heated. If the oil from the pump were not thus substantially vented to the sump, the pump would have to force the oil past the high pressure relief valve 76, with consequent undesirable heating of the oil and waste of power.

Figure 9:
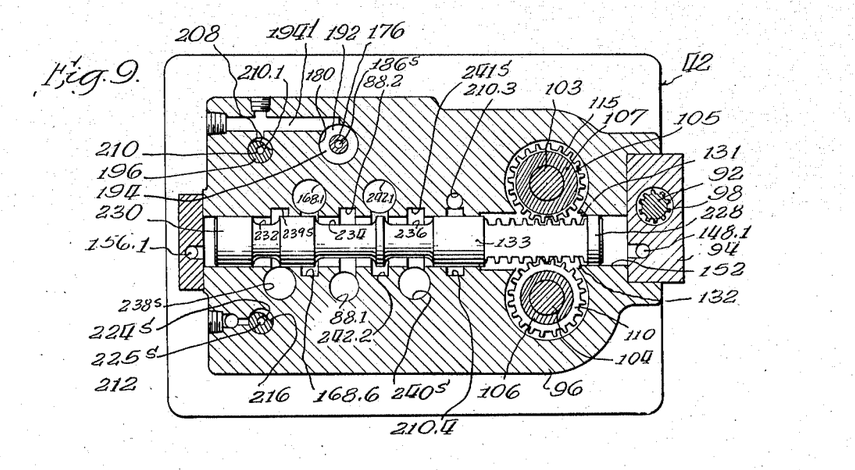
Figure 9 is a vertical sectional view showing particularly the directional valve in the stop or neutral position, and taken on the line 9—9 of Fig. 3.
Figure 10:
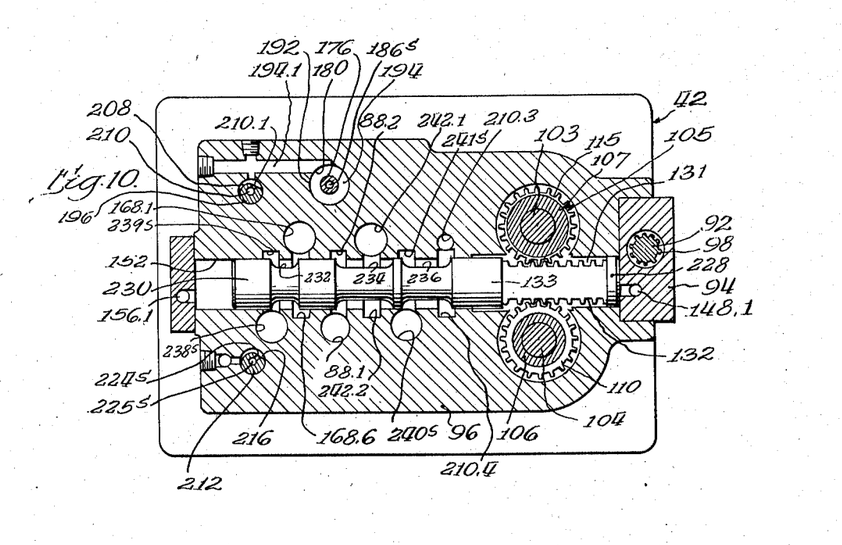
Figure 10 is a view similar to Figure 9, showing the directional valve in position for rapid forward traverse.

In the normal cycle of operations, upon energization of solenoid 166, the first movement of the directional valve will be from its stop position (Fig. 9) through its fine feed position (Fig. 12) and coarse feed position (Fig. 11) to its rapid forward traverse position (Fig. 10). Although this movement of the directional valve through the fine feed and coarse feed positions is so rapid, when the automatic control is used, that the movement of the valve through these two feed positions has no noticeable effect upon the actuation of cylinder 29, the operation of the directional valve during this portion of its cycle will be described as if this first movement of the directional valve and of the pilot valve took place slowly, as when the throw-over valve is positioned for hand control, and the hand pilot valve is moved slowly through its successive positions.

Figure 12:
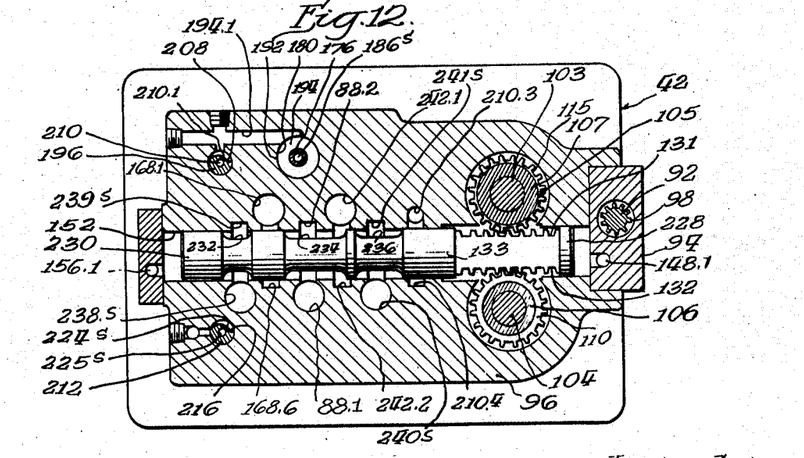
Figure 12 is a view similar to Figure 9, showing the directional valve in position for fine feed.

It will be noted that when the directional valve 133 is in the fine feed position shown in Fig. 12, the oil under pressure supplied through the passageway 88.1 flows through the annular groove 88.2 around the annular passageway 234 to the passageway 242.1 and hence to the left-hand (Fig. 15) end of cylinder 29 tending to cause the cylinder 29 to move to the left. At the same time, oil cannot be forced outwardly from the right hand end of the cylinder 29 through conduit 168 to passageway 168.1 and annular groove 168.6, because the annular groove 168.6 is blocked by the directional valve. The oil, since, it cannot escape from the annular groove 168.6, must flow through the passageway 168.2 through the feed governor valve mechanism 176, 178, through the passageway 194.1 and coarse feed control valve 196 to the passageway 210.2.

It will be noted from Fig. 12 that the passageway 210.3 is closed so that the oil cannot escape therethrough, leaving the passageway 210.4 and fine feed control valve 212 as the only avenue through which the oil can flow to the sump from the rod end of the cylinder 29. By proper adjustment of the fine feed control valve 212, the rate at which the oil thus escapes from the rod end of the cylinder 29 to the sump may be accurately regulated to secure substantially any desired slow feed rate.

The second passing phase of the operating cycle of the directional valve, although of negligibly short duration, comprises its movement to coarse feed position, as shown in Fig. 11. In this figure, the supply of oil flows from the passageway 88.1 to the forward end of the cylinder 29 through the conduit 242 etc., in the same manner as described with reference to Fig. 12. The flow of oil from the rod end of the cylinder 29 through the conduit 168 is still prevented through the annular groove 168.6 by the directional valve, and therefore continues to flow as in the fine feed position through the feed governor and through passageway 194.1 to the coarse feed control valve 196 and hence to the passageway 210.2. It will be noted from Fig. 11 that the duct 210.3, which is in open communication with the passageway 210.2, is partially uncovered by the directional valve 133 so that oil may flow from the annular groove 210.4 through the annular passageway 236 to the annular groove 241S and hence through the passageway 240S to the sump. Thus, the sole means for controlling the rate at which the cylinder 29 may move is the coarse feed control valve 196 with, of course, the intermediate control affected by the feed governor valve 176.

In Fig. 10, the directional valve 133 is illustrated in the position it assumes to cause rapid forward traverse of the head of the machine tool or rapid forward movement of the cylinder 29. When in this position, it will be apparent from an inspection of Fig. 10, the oil under pressure supplied through the duct 88.1 flows through the annular groove 88.2, annular passageway 234 to the annular groove 242.2, passageway 242.1 and conduit 242, and hence to the forward end of the cylinder 29. The rod or right-hand end of cylinder 29 is vented to the sump through a hydraulic circuit including the conduit 168, passageway 168.1, annular groove 168.6, annular passageway 232 on the valve 133, annular groove 239S and passageway 238S.

It will be noted that in Fig. 10 the directional valve 133 is at the right-hand end of its stroke. In the normal sequence of the cycle of operations, the rapid forward traverse, as determined by the directional valve when it is in the position of Fig. 10 is followed by the coarse feed forward operation when the directional valve is moved to the position in which it is shown in Fig. 11 to control hydraulic circuits previously described as effective to cause the coarse feeding portion of the operating cycle of the machine. Thereafter, the directional valve 133 is moved to fine feed position, as shown in Fig. 12 and as above described with reference to said figure.

Upon completion of the fine feeding portion of the operating cycle, the solenoid 164 is energized to move the pilot valve, and hence the directional valve, through stop or neutral position (shown in Fig. 9 and above described with reference thereto) to rapid reverse position.

For the rapid reverse traverse, the directional valve 133 is moved to its leftmost position, as shown in Fig. 13. When in this position, the following hydraulic circuits are completed. Oil under pressure supplied to the passageway 88.1 flows through the connected annular groove 88.2 around the annular passageway 234 of the directional valve and through annular groove 168.6, pasageway 168.1 and conduit 168 to the rod end of the cylinder 29, thus applying pressure to the piston and cylinder tending to move the cylinder 29 to the right (Fig. 15). Oil from the forward end of cylinder 29 may escape to the sump through conduit 242, pasageway 241.1, annular groove 242.2, annular passageway 236, around directional valve 133, annular groove 241S and passageway 240S. It will be noted that the flow of oil into the rod end of cylinder 29 from the supply conduit 88 is unrestricted and similarly that the flow of oil from the forward end of cylinder 29 to the sump is likewise substantially unrestricted. As a result, the cylinder 29 and the machine tool head will move rapidly in a reverse direction.

After the completion of the rapid reverse traverse of the machine tool head, the directional valve will, of course, be returned to its neutral or stop position shown in Fig. 9.

Operation

Figure 16:
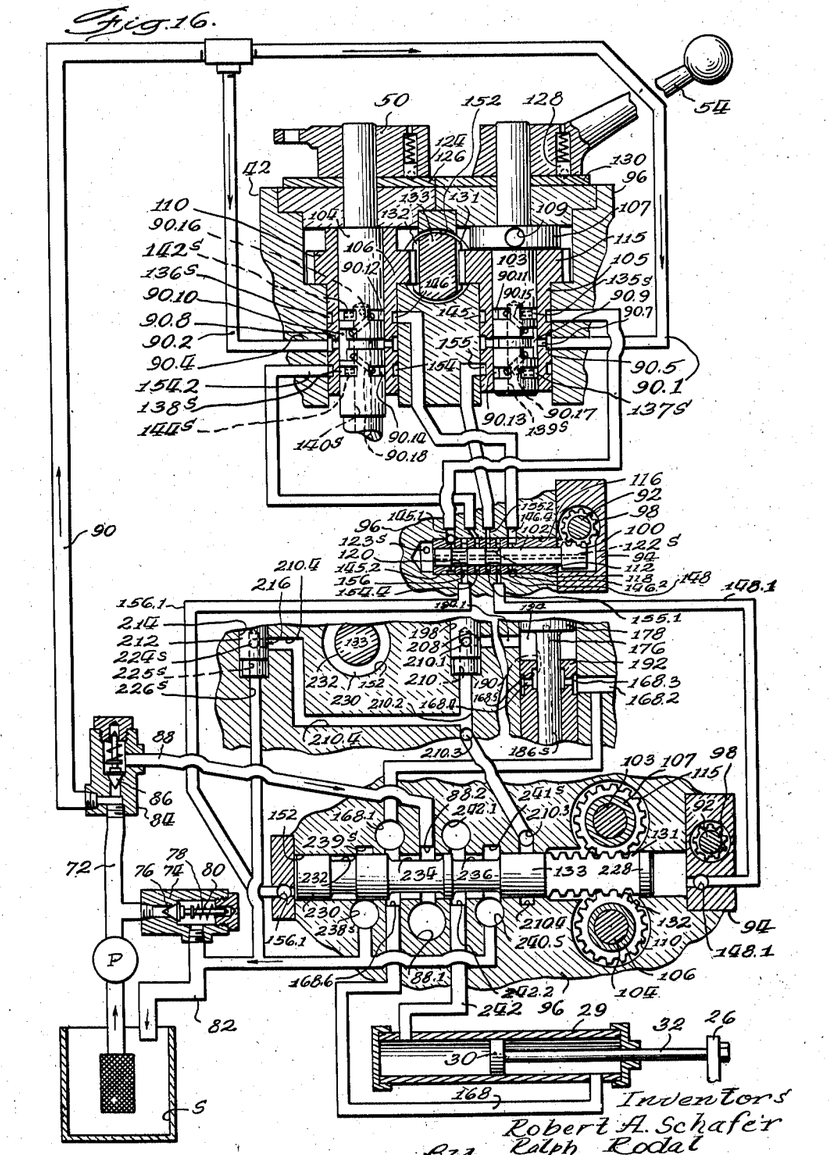
Figure 16 is a diagram showing the hydraulic circuits, illustrating particularly the connections between the various valves.

In the foregoing description of the various parts of the invention, the operation of these parts has been set forth in considerable detail, so that it is believed that a brief general description of the operation of the machine as a whole, referring generally to Fig. 16, correlating the previous description of the various operations performed by the individual parts, will suffice.

Assuming that a work piece 40 has been secured in position upon the table 38 and that the tools 31 are such as require the cycle of feeding operations previously described, the operator will press push button 61 to energize the electric motor 28, causing rotation of the tools 31 and the operation of the pump P to build up suitable operating pressures in the conduits 88 and 90. Thereafter, the operator will press push button 59 to close switch 59a energizing solenoid 166 which moves the pilot valve 104 to rapid forward traverse position.

In order to get to rapid forward traverse position from the neutral or stop position in which the valve 104 was assumed to be positioned, the valve must successively pass its fine feed and coarse feed positions. Correspondingly, the directional valve 133, in order to move from its stop position of Fig. 9 to its rapid forward traverse position of Fig. 10, must pass through the fine feed and coarse feed positions of Figs. 12 and 11, respectively. However, its movement from stop or neutral position to its rapid forward traverse position is continuous, and the only effect of the valve 133 passing through its fine feed and coarse feed positions is to decrease slightly the suddenness with which the oil under pressure is applied to the forward end of the cylinder 29, or more exactly, the suddenness with which the oil pressure in the rod end of the cylinder 29 is relieved.

After the head of the machine tool has thus been moved rapidly to the position at which the tools 31 are about to engage the work, the lower end of arm 44 strikes the dog 46 and is raised thereby, thus, through the link 52 and arm 50 swinging the automatic pilot valve 104 counterclockwise (Figs. 1, 2, 4, 5 and 6) to a position such that the directional valve 133 will be moved to its coarse feed position shown in Fig. 11. Under these conditions, the rate at which the head will be moved forwardly will be determined by the rate at which the oil in the rod end of cylinder 29 may escape to the sump through the feed governor valve 176 and the coarse feed governor valve 196.

It will be understood that the rate at which oil will flow through a restricted passageway or orifice depends upon the differential pressure involved, as well as upon the size of the passageway or orifice. Since the size of the passageway through the coarse feed valve 196 does not vary after it has been adjusted to the desired position, it is necessary to maintain uniformly the differential pressure upon opposite sides of this orifice or passageway, and this is accomplished with a very high degree of accuracy by the feed governor valve 176, since any slight increase in pressure in the chamber 194 of the feed governor valve results in upward movement of the valve 176 and consequent restriction of the flow of oil into the chamber 194 until the pressure in the latter chamber again drops to the predetermined value.

After the head of the machine tool has thus been controlled for the coarse feed portion of its cycle, the lower end of the arm 44 will engage the dog 47 and swing further counterclockwise, thereby to shift the automatic pilot valve 104, and hence the directional valve 133 to their respective fine feed positions. It will be recalled that when the directional valve 133 is in its fine feed position, the passageway 210.3 from the coarse feed control valve 196 is blocked so that the only pathway for the escape of oil from the rod end of the cylinder 29 is through both the coarse feed valve 196 and through the fine feed valve 212.

Due to the greater restrictions offered to the flow of oil through this path, the amount of the restriction depending principally upon the adjustment of the fine feed valve 212, the head of the machine tool will be moved forward at a very slow rate which is predetermined to correspond with the desired feed rate of the tools 31 into the work piece 40.

After the tools have completed their respective operations upon the work piece, the limit switch actuator 66 will engage the limit switch dog 68 and thereby close the limit switch 64a. The closure of this switch will result in energization of the solenoid 164 which will swing the automatic pilot valve 104 counter-clockwise to its rapid reverse position, with consequent movement of the directional valve 133 to its rapid reverse traverse position, as shown in Fig. 13.

It will be noted that in order to move from its fine feed position to its rapid reverse traverse position, the directional valve 133 must move through its stop position.

The rapid reverse traverse portion of the operating cycle is arrested by engagement of the downwardly projecting arm 44 with the dog 45, the shape of the part of the dog 45 engaged by the end of the arm 44 being such as accurately to locate this arm in a position such that the automatic pilot valve 104 and consequently the directional valve 133 are accurately moved to their respective stop or neutral positions. As a consequence, the head will come to rest and the operator may then remove the work piece 40 from the table 38 and replace it with another piece to be machined.

If during any part of the cycle of operations, a tool should break or for any other reason the operator considers it undesirable for the machine to complete its normal cycle of operations, the operator will press the push button 60, thus closing the switch 60a, and initiating a rapid traverse movement of the head, irrespective of the position of the head at the time (assuming that it is not in its fully retracted stop position).

The operation above has been described on the assumption that the handle 56 is in its upper or automatic control position with the hand pilot valve 103 locked in position by the locking pin 111. When setting up the tools, or whenever any adjustment thereof is required, it is desirable that the head of the machine tool be subject to hand control. This shift from automatic to hand control is accomplished by clockwise swinging movement of the handle 56 which moves the throw-over valve 102 from the position in which it is shown in Fig. 7 to the position in which it is shown in Fig. 8. Whenever this is done, the handle 54 is of course in neutral or stop position, because it is always held in this position by the locking pin 111, and therefore movement of the head of the machine tool cannot result from merely shifting the handle 56 from automatic control position to hand control position, but if the head is in motion at the time the shift from automatic to hand control is made, the head will of course come to rest.

After such shift of the handle 56 has been effected, the hand pilot valve 103 assumes control of the position of the directional valve 133 by virtue of the change-over effected by the throw-over valve 102. As a consequence, the directional valve may be moved to any one of its five positions merely by swinging the handle 54 to the desired position. When the throw-over valve handle 56 is in the hand control position, the movement of the arm 44 by the dogs 45, 46 and 47 will not have any effect, nor will the limit switch 64a have any effect upon the movement of the tool head. Thus, the handle 54 may be moved to position to cause any desired movement of the head of the tool. For example, during the setting up of the machine, the handle 54 may be moved to the fine feed position and the head made to move very slowly through any desired distance so that adjustments of the positions of the tools and of the dogs 45, 46, 47 and 68 may be made conveniently and accurately.

The fact that the machine tool head will always come to rest when the handle 56 is swung from automatic to hand position is an advantageous feature since the handle 56 may be moved in this manner as a convenient method of quickly stopping movement of the head. It will be understood, from the above description, that the hand controlled pilot valve is locked in its neutral or stop position whenever the handle 56 is in automatic control position. Thus, upon shifting this handle from automatic to hand control position, the hand controlled pilot valve immediately causes the directional valve to move to stop position, irrespective of its previous position.

Furthermore, when the hand controlled pilot valve is in use to direct the hydraulic traverse means, the automatic pilot valve is nevertheless moved by the cams or dogs 45, 46, and 47 and the solenoids 164 and 166 so that it is at all times in the position necessary to resume control at the proper point in the cycle. This is important in setting up because the operator can, using the hand control, cause the machine head to rapidly traverse forwardly past the feed cam or cams and then stop the traverse, re-position the feed cam or cams, change to automatic control, and the machine head will then resume the automatic cycle in feed traverse.

It should be clearly understood that while the operator is controlling the position of the machine head by the handle 54, the automatic pilot valve 104 is moved by the engagement of the dogs 45, 46, and 47 with lever 44, and by the solenoid 166 controlled by the limit switch 64a. This movement of the automatic pilot valve 104 depends solely upon the position of the machine tool head with respect to the dogs. However, the automatic pilot valve is ineffective until the handle 56 is again shifted to the automatic position.

Upon completion of the day's operations, the operator will press the push button 62 which opens switch 61a and stops the motor 28. If desired, such operation of the push button 62 may also be made to de-energize the circuit which supplies electric power to the solenoids 164 and 166 either directly or through a suitable relay.

It will be noted that the bores in which the various valves are mounted all extend to the front surface or one of the end surfaces of the panel 96 and that by removal of suitable bushings holding the valves in place and sealing the ends of these bores, the valves may readily be removed for inspection, cleaning, or replacement. Thus, substantially all of the parts of the hydraulic control mechanism are accessible without removing the panel 96 from the housing 25. Furthermore, practically all of the various passageways and ducts by which the various valves are interconnected, are formed by holes drilled in the panel itself, so that very little piping external to the panel is required.

Since the rear face of the panel is directly above the sump within the housing 25, such passageways as lead to the sump (e. g. 238S, 240S and 226S) require no connections. In addition, it will be noted that the passageways connecting the various valves are very short and have very few bends therein, so that they offer relatively little frictional resistance to the rapid flow of the oil between the valves. As a result, the operation of the various valves is extremely rapid.

By virtue of the fact that the pilot valves are provided to control the flow of oil to the ends of the directional valve cylinder, the solenoids used to control the directional valve through the intermediate operation of the automatic pilot valve may be very small, thus requiring a small amount of electric power for their energization, and making it possible to attach them in convenient position for direct operation of the automatic pilot valve.

Due to the sequence of the portions of the cycle whereby the directional valve must move through stop position before being moved to reverse position, and can only be moved from reverse position to another position by passing through the stop position, the possibility of jarring the machine head by having the directional valve pass through reverse traverse position as an incident to passing from stop to forward traverse position, is avoided, with resultant elimination of undesirable jarring of the tool carrying head.

While the hydraulic control apparatus of our invention is illustrated as applied to the control of an automatic horizontal drilling machine, it will be understood that the apparatus may be readily adapted for the control of any machine tool part which is to be moved through a reciprocatory cycle at controlled speeds for different portions of the cycle.

While we have shown and described a particular embodiment of our invention, it will be apparent to those skilled in that art that numerous modifications and variations thereof may be made without departing from the fundamental principles of the invention. We therefore desire by the following claims to include within the scope of our invention all such modified and similar apparatus whereby substantially the results of our invention may be obtained in a similar manner by substantially the same or equivalent means.

We claim:

1. In a hydraulic control apparatus for a machine tool which has a hydraulic piston and cylinder for moving a part thereof, the combination of a directional valve for controlling the flow of oil to and from the ends of said cylinder, a pair of pilot valves, each of said valves comprising an actuated element and a follower element, means for moving said follower elements distances proportional to the distance said directional valve is moved, and hydraulic means for moving said directional valve in response to relative movement of the elements of one of said pilot valves.

2. In a hydraulic control apparatus for a machine tool which has a hydraulic piston and cylinder for moving a part thereof, the combination of a panel, a pair of bores in said panel, pilot valve follower sleeves rotatable in said bores respectively, pilot valve elements rotatable in said sleeves, a directional valve for controlling the admission of oil under pressure to and the discharge of oil from said cylinder, valve ports opened and closed by relative movement of said elements and their respective sleeves to control the position of said directional valve, and a mechanical connection between said directional valve and said sleeves to cause said sleeves and directional valve to move proportionately.

3. In a hydraulic control apparatus for a machine tool which has a hydraulic piston and cylinder for moving a part thereof, the combination of a pilot valve having two elements movable with respect to each other and forming a plurality of valves which are opened and closed by such relative movement, means for mechanically moving one of said elements in response to the position of said machine tool part, a directional valve for controlling the admission of oil to and discharge of oil from said cylinder, and gearing connecting said directional valve with the other of said elements of said pilot valve.

4. In a hydraulic control apparatus for a machine tool which has a hydraulic piston and cylinder for moving a part thereof, the combination of a pair of pilot valves, a directional valve for controlling the admission to and the discharge of oil from the ends of said cylinder, hydraulic and mechanical means interconnecting said pilot valves and said directional valve for controlling the position of said directional valve in response to the positions of said pilot valves, and manually operable means for rendering one or the other of said pilot valves ineffective to control the operation of said directional valve.

5. In a hydraulic control apparatus for a machine tool which has a hydraulic piston and cylinder for moving a part thereof, the combination of an automatic pilot valve and a hand pilot valve, means responsive to the position of said machine tool part to control the position of said automatic pilot valve, a handle for manually controlling the position of said manual pilot valve, a directional valve responsive to the position of one of said pilot valves for controlling the operation of said hydraulic piston and cylinder, and a throw-over valve for selectively rendering said hand pilot valve or said automatic pilot valve ineffective to control said directional valve.

6. In a hydraulic control apparatus for a machine tool which has a hydraulic piston and cylinder for moving a part thereof, the combination of a main valve for controlling the admission of hydraulic actuating liquid to and the discharge of said liquid from the opposite ends of said cylinder, hydraulic means for actuating said valve, said last-named means including a pair of pilot valves and means for selectively rendering either of said pilot valves ineffective to control said main valve.

7. A hydraulic control apparatus comprising a body having a pair of parallel bores therein, pilot valve sleeves in said bores respectively, pilot valves rotatably mounted in said sleeves, a directional valve cylinder extending in a direction perpendicular to said bores, a directional valve reciprocable in said cylinder, and a driving connection to cause rotation of said pilot valve sleeves upon reciprocation of said directional valve.

8. In a hydraulic control apparatus, the combination of a pair of pilot valves, a directional valve hydraulically operated under the control of said pilot valves and mechanically connected to parts of said pilot valves for positioning the latter, and a throw-over valve for optionally rendering either of said pilot valves ineffective to control said directional valve.

9. In a hydraulic control apparatus for a machine tool which has a hydraulic piston and cylinder for moving a part thereof, the combination of a directional valve for controlling the flow of oil to and from the ends of said cylinder, a pair of pilot valves, each of said valves comprising an actuated element and a follower element, means for moving said follower elements distances proportional to the distance said directional valve is moved, means for selectively rendering one of said pilot valves ineffective, and hydraulic means for moving said directional valve in response to relative movement of the elements of the other of said pilot valves.

10. A pilot valve assembly for fluid control apparatus, comprising, a rotatable sleeve having a pair of ports therein, a valve element rotatably mounted in said sleeve, said element having two pairs of chambers, the chambers of a pair being on diametrically opposite sides of said element and located so as to communicate with one of said ports upon relative movement of said element and said sleeve, a source of fluid under pressure, a reservoir at substantially atmospheric pressure, passageways connecting two of said chambers on the same side of said element to said source, passageways connecting the other two of said chambers to said reservoir, and a recess formed in said element between said pairs of chambers and connected to said source, said recess being shaped to balance the forces due to fluid pressure acting upon said element in said chambers which are connected to said source.

11. In a hydraulic control apparatus for a machine tool which has a hydraulic piston and cylinder for moving a part thereof, the combination of a panel, a pair of bores in said panel, pilot valve follower sleeves rotatable in said bores respectively, pilot valve elements rotatable in said sleeves, a directional valve mounted for movement in said panel for controlling the admission of oil under pressure to and the discharge of oil from said cylinder, valves operated by relative movement of said elements and their respective sleeves to control the position of said directional valve, a pair of racks on said directional valve, a pair of pinions on said sleeves meshing respectively with said racks to cause said sleeves and directional valves to move proportionately.

ROBERT A. SCHAFER.
RALPH RODAL.